United States Patent [19]
Gaa et al.

[11] Patent Number: 5,457,152
[45] Date of Patent: Oct. 10, 1995

[54] VARICOLORED ARTICLES WITH CRYSTALLINE THERMOPLASTIC CHIPS

[75] Inventors: Peter C. Gaa, Lott; Beth A. Rabroker, Temple, both of Tex.

[73] Assignee: Ralph Wilson Plastics Company, Temple, Tex.

[21] Appl. No.: 19,524

[22] Filed: Feb. 19, 1993

[51] Int. Cl.$^6$ .............. C08K 3/34; C08K 3/40; C08L 67/00
[52] U.S. Cl. ............... 524/449; 524/437; 524/494; 523/513
[58] Field of Search ................ 524/449, 494, 524/437; 523/513

[56] References Cited

U.S. PATENT DOCUMENTS

| | | | |
|---|---|---|---|
| 3,396,067 | 8/1968 | Schaffer | 161/5 |
| 3,405,088 | 10/1968 | Slocum | 260/41 |
| 3,780,156 | 12/1973 | Cameron | 264/300 |
| 3,827,933 | 8/1974 | Duggins | 161/176 |
| 4,085,246 | 4/1978 | Buser | 428/220 |
| 4,159,301 | 6/1979 | Buser | 264/331 |
| 4,193,908 | 3/1980 | Hsieh | 260/40 R |
| 4,433,070 | 2/1984 | Ross | 523/171 |
| 4,533,680 | 8/1985 | Kasuga | 523/220 |
| 4,544,584 | 10/1985 | Ross | 428/15 |
| 4,961,995 | 10/1990 | Ross | 428/409 |
| 4,983,668 | 1/1991 | Cutter | 525/23 |
| 5,032,625 | 7/1991 | Ross | 523/205 |
| 5,043,377 | 8/1991 | Nogi | 524/437 |
| 5,164,425 | 11/1992 | Uchida | 523/171 |

*Primary Examiner*—Paul R. Michl
*Assistant Examiner*—LaVonda R. DeWitt
*Attorney, Agent, or Firm*—Fred E. Hook

[57] ABSTRACT

Filled crystalline thermoplastic resin chips are incorporated into a filled synthetic resin matrix for producing varicolored mineral appearing articles. Wollastonite filled polyphthalamide resin chips increase the surface hardness and decrease the ASTM E 84 Smoke Index of neopentyl glycol/isophthalic polyester molded articles. Crystalline thermoplastics can be extruded in shapes for providing varishaped chips.

19 Claims, No Drawings

VARICOLORED ARTICLES WITH CRYSTALLINE THERMOPLASTIC CHIPS

BACKGROUND OF THE INVENTION

1. Field of the Invention

The present invention relates to molded thermoplastic articles that have a mineral appearance. This invention relates to thermoplastic articles molded with synthetic resin chips for imparting a granite or other varicolored appearance to the article.

2. Description of the Related Art

Mineral appearing molded synthetic resin articles are being fabricated into commercially attractive, prestigious cabinets, vanities and other decorative items. These mineral appearing molded synthetic resin articles are commercially available as flat sheets and as sinks and basins. Fabrication of these articles into decorative items is being achieved with commercially available woodworking tools and techniques. (See U.S. Pat. No. 5,043,377)

The synthetic resins used for molding these articles can be commercially available transparent, unsaturated polyester or cross-linked methyl methacrylate thermosetting resin forming compositions. The synthetic resins used for producing these articles are highly filled with mineral particles having substantially the same refractive index as the cured matrix synthetic resin. The mineral particles have particle sizes less than about 50 microns for producing articles in which the mineral particles are transparent.

Molded articles filled with 50 to 80 percent by weight of the molded article of mineral particles have surface hardnesses approaching the surface hardness of minerals. Surface hardnesses along with the transparency of the matrix synthetic resin of these molded articles contribute substantially to their commercial attractiveness. (See U.S. Pat. Nos. 3,396,067 and 3,405,088)

Alumina trihydrate ($Al_2O_3 \cdot 3H_2O$) can be use as the mineral particles. Alumina trihydrate releases water when heated for imparting reduced flame spread and smoke density to the molded article. Articles molded with commercially available unsaturated polyester resin and filled with alumina trihydrate can meet flame spread and smoke density requirements for construction materials. (See U.S. Pat. Nos. 3,780,156; 3,827,933; 4,193,908 and 5,164,425)

A granite or other varicolored mineral appearance can be achieved with these molded articles by incorporating synthetic resin chips in the synthetic resin forming composition. The chips can be opaque or translucent for providing visibility for the chips in the molded article. Pigmented chips can provide a color contrast between the chips and the matrix synthetic resin of the molded article. The size and concentration of these chips are selected to provide a molded article with a commercially attractive appearance. Particle sizes of 50 to 3000 microns can be used. The chips can constitute from 2 to 15 parts by weight of the molded article. (See U.S. Pat. Nos. 4,085,246; 4,159,301; 4,433,070; 4,544, 584; 4,961,995; 4,983,668 and 5,032,625)

It has now been discovered that certain chips for achieving the varicolored mineral appearance can increase the surface hardness of molded articles and reduce the ASTM Smoke Index for the article.

SUMMARY OF THE INVENTION

Wollastonite filled polyphthalamide chips have been discovered to increase the surface hardness of molded alumina trihydrate filled neopentyl glycol/isophthalate polyester resin articles and to reduce the ASTM Smoke Index for the article. Crystalline thermoplastic resins filled with inorganic particles can be used as chips for achieving a varicolored appearance for molded thermoset resin articles.

Filled crystalline polyphenylene sulfide, polyethylene terephthalate, and polybutylene terephthalate resins have been discovered to be useful in producing these chips. Filled liquid crystal 4,4'-Dihydroxydiphenyl-p-hydroxybenzoic acid terephthalic acid polymer has also been discovered to be useful in producing these chips. Other filled crystalline thermoplastic resins, such as polyamide-imide, polyester-imide, polyimide resins and other polyamide and polyalkylene terephthalate resins can be used for producing these chips. Other filled liquid crystal polyester polymers can be used for producing these chips.

The filled crystalline thermoplastic chips can be filled with particles of such inorganic materials as alumina trihydrate, antimony oxide, barium sulfate, calcium carbonate, calcium sulfate, glass, kaolin, metal carbonates, oxides and sulfates, mica, silica, talc, and wollastonite. Preferably, the crystalline thermoplastic chips are filled with fibrous or flaky particles of such inorganic materials as glass, mica, and wollastonite.

DETAILED DESCRIPTION OF THE INVENTION

The varicolored mineral appearing molded articles of this invention are molded with resin forming compositions that incorporate crystalline thermoplastic chips. These chips are highly filled with inorganic particles. Preferably these inorganic particles have a mean aspect ratio (ratio of one dimension to another) of greater than about 3. The preferred molded articles of this invention have improved surface hardness and reduced ASTM Smoke Index. Preferred crystalline thermoplastic chips have been recovered after a varicolored mineral appearing molded article of this invention was destroyed by burning the article.

Crystalline thermoplastic resins filled with inorganic fillers, particularly in the form of fibrous or flaky particles are useful in molding machine parts (See U.S. Pat. No. 4,533, 680). It has now been discovered that chips of crystalline polyphthalamide resin filled with wollastonite particles having a mean aspect ratio of about 5 and a mean particle size of less than about 50 microns is useful in producing the filled crystalline chips used in the molding of the varicolored mineral appearing synthetic resin articles.

Filled crystalline polyphenylene sulfide, polyethylene terephthalate, and polybutylene terephthalate resins have also been discovered to be useful in producing the molded articles of this invention. Filled liquid crystal 4,4'-Dihydroxydiphenyl-p-hydroxybenzoic acid terephthalic acid polymer has been discovered to be useful in producing the molded articles of this invention. It is thought that other filled crystalline thermoplastic resins, such as polyamide-imide, polyester-imide, polyimide resins and other polyamide and polyalkylene terephthalate resins will be useful for producing the molded articles of this invention. Other filled liquid crystal polyester polymers should be useful for producing the molded articles of this invention.

The crystalline thermoplastic resin suitable for use in this invention needs to possess a number of important characteristics. It should not swell or soften when incorporated in the matrix resin composition. It should not soften or decompose at the temperatures reached during the exothermic curing of the molded article of this invention. It should not be hygroscopic. It should not discolor or decompose if the molded articles of this invention are exposed to heat or ultraviolet radiation. It should have a low coefficient of thermal expansion and not have odorous emissions.

Wollastonite is a naturally occurring acicular (needle like) mineral consisting of calcium metasilicate ($CaSiO_3$). Wollastonite occurs naturally in the fibrous form with high aspect ratios (ratio of length to diameter) of about 3 to about 20. Wollastonite also occurs naturally in the low aspect ratio form. Wollastonite particles with a mean aspect ratio of at least about 5 are the preferred particles for use in producing the filled crystalline thermoplastic chips used in producing the molded articles of this invention. Wollastonite has a specific gravity of about 2.9 grams per cubic centimeter.

The filled crystalline thermoplastic chips used in producing the molded articles of this invention can be filled with particles of such inorganic materials as alumina trihydrate, antimony oxide, barium sulfate, calcium carbonate, calcium sulfate, glass, kaolin, metal carbonates, oxides and sulfates, mica, silica, talc, and wollastonite. Preferably, the crystalline thermoplastic chips are filled with fibrous or flaky particles of such inorganic materials as glass, mica, and wollastonite.

The bonding between the inorganic particles and the crystalline thermoplastic resin can be improved with commercially available surface treating materials such as organo-silane coupling agents. Improved bonding should increase the surface hardness of the molded articles of this invention. Improved bonding should also reduce moisture absorbency.

These crystalline thermoplastic chips should be filled with at least about 50 and preferably about 60 percent by weight of the chips of these inorganic particles having a mean particle size of less than about 50 microns. Inorganic fillers in the crystalline thermoplastic chips can contribute to the surface hardness of the molded article of this invention. It is thought that the crystalline thermoplastic chips can not be filled with more than about 80 percent by weight of the chips of these inorganic particles due to the consistency of the crystalline thermoplastic as it is being filled.

The particle size and shape of these crystalline thermoplastic chips are selected for imparting the desired granite appearance to the molded article of this invention. The particle size of these crystalline thermoplastic chips should be greater than about 50 microns for identifying these chips as discrete particles in the molded articles of this invention. Crystalline thermoplastic chips having mean particle sizes of about 50 to about 3000 microns are preferred. Particle sizes of as much as 25,000 microns may be desirable for achieving the desired granite appearance.

The color and concentration of the crystalline thermoplastic chips are selected for achieving the desired varicolored appearance. It has been found that crystalline thermoplastic chips having a consistent color from batch to batch can be produced. Pigments for achieving commercially attractive colors are much more compatible with these crystalline thermoplastic resins than with thermoset resins. The extrusion molding process provides for excellent mixing of the inorganic particles and pigments with the crystalline thermoplastic resin. Controls inherent in the extrusion process make color matching more consistent than experienced in color matching thermoset resins. Extrusion molding also provides the opportunity for producing varishaped as well as varicolored crystalline thermoplastic chips. Fibrous articles or flat sheets of filled crystalline thermoplastic resin can be extruded. The shape of the fibrous article can be varied to achieve interesting shapes for the filled crystalline thermoplastic chips used in the molding of the molded articles of this invention.

A chip concentration of at least 2 percent by weight of the molded article is necessary for achieving a granite appearance. A chip concentration of about 2 to about 15 percent by weight of the molded article are desirable for achieving a commercially attractive varicolored appearance. Higher chip concentrations may be desired for achieving a desired varicolored appearance and for enhancing the surface hardness of the molded article of this invention.

Wollastonite filled polyphthalamide resin chips are preferred for imparting a varicolored appearance to the unsaturated polyester resin molded articles of this invention. These molded articles have greater surface hardnesses and produce lower smoke densities when burned than unsaturated polyester resin molded articles containing thermoset resin chips.

Chips having a concentration of about 60 percent by weight of the chips of wollastonite have a density of about $1.7\pm0.4$ grams per cubic centimeter ($g/cm^3$). The density of these chips is sufficiently close to the density of the alumina trihydrate filled neopentyl glycol/isophthalic acid polyester matrix resin composition used for molding the preferred articles of this invention (about 1.65 $g/cm^3$) that substantially no gravity separation of the chips occur. This results in a homogeneous granite appearing article.

Commercially available thermoset unsaturated polyester chips for molding unsaturated polyester articles has a density of about 2 $g/cm^3$. These chips may be subject to gravity separation during the molding operation. The resulting article may not have a homogeneous appearance. The high density results in part from the cross-linking employed for producing a friable product and in part from the concentration of alumina trihydrate employed.

The use of crystalline thermoplastic chips provides additional advantages over the use of thermoset chips for achieving a varicolored appearance in molded thermoset plastic articles. Crystalline thermoplastic can be extruded for making it possible to produce commercially interesting particle shapes. Crystalline thermoplastic chips can be conveniently recycled. The crystalline thermoplastic material remaining after recovering the crystalline thermoplastic chips for achieving the desired varicolored appearance can be recycled through the extrusion molder. Thermoset materials remaining after recovering thermoset chips are disposed of. Disposal of materials adds to the cost of operations.

EXAMPLE 1

Enhanced surface hardness and reduction in the ASTM Smoke Index of the molded articles of this invention are shown on Table 1. The molded articles shown on Table 1 contained about 7.5 percent by weight (wt. %) of the article of chips (Control 1/7.5 wt. %, Example 1/7.252 wt. %, and Example 2/7.5 wt. %). The chips used in Control 1 were thermoset chips produced from the same unsaturated polyester resin forming composition as the matrix composition used for molding the articles of Examples 1 and 2. The chips used in Examples 1 and 2 were produced from wollastonite filled (60 wt. % by weight of the chips) polyphthalamide resin having particle sizes of about 250 to about 1200 microns. This wollastonite filled polyphthalamide resin is commercially available from Amoco Performance Products Company as Amodel A-1460 resin. The particle sizes of 98 wt. % of the wollastonite particles were less than about 40 microns.

The matrix unsaturated polyester resin composition consisted of about 23.71 wt. % neopentyl glycol/isophthalate polyester resin, 9.52 wt. % methyl methacrylate monomer, 0.35 wt. % Tixogel PL-S brand viscosity control additive, and 66.43 wt. % alumina trihydrate particles. The matrix unsaturated polyester resin composition was catalyzed with about 0.33 wt. % Trigonox 141 brand catalyst based on the weight of the matrix unsaturated polyester resin composition. This neopentyl glycol/isophthalate polyester resin is commercially available from Interplastics Corporation as COR 93-DE-531 unsaturated polyester resin. These alumina trihydrate particles are commercially available from Sumitomo as CW308HW brand alumina trihydrate. Trigonox 141 brand catalyst is commercially available from AKZO. Tixogel PL-S additive is commercially available from United Catalyst.

The chips were mixed with the matrix resin composition and flat sheets were molded. Flexural modulus was determined under American Standard Testing Materials Designation: D 790 - 90 (ASTM D 790 - 90). Smoke density was determined under American Standard Testing Materials Designation: E 84 - 91a (ASTM E 84 - 91a). Flexural modulus is a measure of the surface hardness of an article.

TABLE 1

|  | CONTROL 1 | EXAMPLE 1 | EXAMPLE 2 |
| --- | --- | --- | --- |
| ASTM D-790 FLEXURAL MODULUS (mmpsi) | 1.631 | 1.662 | 1.723 |
| ASTM E84 SMOKE INDEX | 25 | 15 | 15 |

Enhanced surface hardness and reduction in the ASTM Smoke Index of the molded articles of this invention are shown on Table 2. The articles shown on Table 2 were molded with the same matrix resin composition and chips used for molding the articles of Examples 1 and 2. In molding the articles of Examples 3 and 4, the wollastonite filled polyphthalamide resin chips were dried 24 hours at 1600° F. before being incorporated into the matrix resin composition. Example 3 contained about 7.253 wt. % chips. Example 4 contained about 2.418 wt. % chips.

TABLE 2

|  | CONTROL 1 | EXAMPLE 3 | EXAMPLE 4 |
| --- | --- | --- | --- |
| ASTM D-790 FLEXURAL MODULUS (mmpsi) | 1.631 | 1.842 | 1.673 |
| ASTM E84 SMOKE INDEX | 25 | 15 | 10 |

EXAMPLE 3

Sheets of alumina trihydrate filled (about 66 wt. % of the alumina trihydrate/polyester resin composition) neopentyl glycol/isophthalic acid polyester resin were molded with chips of various thermoplastic resins for evaluating their compatibility. The resulting sheets were sanded to determine the bonding characteristics of the polyester resin with the chips. ASTM E 84 Flame Spread and Smoke Density tests were conducted to evaluate the impact of these thermoplastics. It was found that polyphthalamide resin (AMODEL A1240) and 4-4'-Dihydroxydiphenyl-p-hydroxybenzoic acid terephthalic acid polymers (XYDAR FSR315) that are commercially available from Amoco Performance Products Company were not disturbed by the sanding and had about the same Hame Index but a better Smoke Index than the control. The control was a sheet of alumina trihydrate filled neopentyl glycol/isophthalic acid polyester resin. It was also found that commercially available polyphenylene sulfide resin (TEDUR KU 1-9523) from Bayer; polybutalene terephthalate resin (VALOX HV7065) from General Electric; and polyethylene terephthalate resin (ARNITE A-X4307) from AKZO were not disturbed by the sanding and had about the same Hame Index but a higher Smoke Index than the control.

As is readily apparent from the above description, additional advantages and modifications will readily occur to one skilled in the art. The invention in its broader aspects is not limited to the specific examples shown and described. Accordingly, departures may be made from the details shown in the examples without departing from the spirit or scope of the disclosed general inventive concept.

We claim:

1. A varicolored molded synthetic resin article comprising (a) a continuous synthetic resin matrix, (b) inorganic particles having substantially the same refractive index as the synthetic resin matrix and mean particle sizes less than about 50 microns; and (c) an effective amount of inorganic particle filled crystalline thermoplastic resin chips comprising crystalline thermoplastic resin selected from the group consisting of polyalkylene terephthalate, polyamide, polyamide-imide, polyester-imide, polyimide and polyphenylenesulfide resin and 4-4'-Dihydroxydiphenyl-p-hydroxybenzoic acid terephthalic acid polymers and mixtures thereof and inorganic particles for imparting a varicolored appearance to the article; wherein inorganic particles comprise at least about 50 percent by weight of the chips; and wherein the crystalline thermoplastic resin will not swell or soften when mixed with the synthetic resin and will not soften or decompose during the curing of the synthetic resin; and wherein inorganic particles comprise at least about 50 percent of the combined weights of component (a), synthetic resin, and component (b), inorganic particles.

2. A varicolored molded synthetic resin article of claim 1 wherein the polyamide resin is polyphthalamide resin.

3. A varicolored molded synthetic resin article of claim 1 wherein the inorganic particles are selected from the group consisting of fibrous or flaky particles of glass, mica, or wollastonite and mixtures thereof.

4. A varicolored molded synthetic resin article of claim 1 wherein the inorganic particles are wollastonite particles having a mean aspect ratio of at least about 3.

5. A varicolored molded synthetic resin article of claim 1 wherein the chips comprise polyphthalamide resin filled with at least about 60 percent by weight of the chips of wollastonite particles having an aspect ratio of at least about 5.

6. A varicolored molded synthetic resin article of claim 5 wherein at least about 98 percent by weight of the wollastonite particles have a particle size of less then about 40 microns.

7. A varicolored molded synthetic resin article of claim 1 wherein the molded article comprises at least about 2 percent by weight of the molded article of filled crystalline thermoplastic resin chips.

8. A varicolored molded synthetic resin article of claim 1 wherein the molded article comprises about 2 to about 15 percent by weight of the molded article of filled crystalline thermoplastic resin chips.

9. A varicolored molded synthetic resin article of claim 1 wherein the crystalline thermoplastic resin chips have particle sizes of about 50 to about 3000 microns.

10. A varicolored molded synthetic resin article of claim 1 wherein the filled crystalline thermoplastic resin chips are of various shapes.

11. A varicolored molded synthetic resin article comprising (a) a continuous unsaturated polyester resin matrix (b) alumina trihydrate particles having a mean particle size of less than about 50 microns; and (c) an effective amount of wollastonite filled polyphthalamide resin chips comprising polyphthalamide resin and wollastonite particles for imparting a varicolored appearance to the article; wherein the wollastonite particles comprise at least about 50 percent by weight of the chips and wherein the wollastonite particles have a mean aspect ratio of at least about 3: and wherein alumina trihydrate particles comprise at least about 50 percent of the combined weight of component (a), unsaturated polyester resins and component (b), alumina trihydrate particles.

12. A varicolored molded synthetic resin article of claim 11 wherein the molded article comprises at least about 2 percent by weight of the molded article of filled polyphthalamide resin chips.

13. A varicolored molded synthetic resin article of claim 11 wherein the molded article comprises about 2 to about 15 percent by weight of the molded article of filled polyphthalamide resin chips.

14. A varicolored molded synthetic resin article of claim 11 wherein the chips have particle sizes of about 50 to about 3000 microns.

15. A varicolored molded synthetic resin article comprising (a) a continuous neopentyl glycol/isophthalate polyester resin matrix (b) alumina trihydrate particles having a mean particle size of less than about 50 microns; and (c) an effective amount of wollastonite filled polyphthalamide resin chips comprising polyphthalamide resin, and wollastonite for imparting a varicolored mineral appearance to the article; wherein the wollastonite particles comprise at least about 60 percent by weight of the chips and wherein the wollastonite particles have a mean aspect ratio of at least about 5; and wherein alumina trihydrate comprises at ! east about 60 percent of the combined weights of component (a), neopentyl glycol/isophthalate polyester resin, and component (b), alumina trihydrate particles.

16. A varicolored molded synthetic resin article of claim 15 wherein the filled polyphthalamide resin chips have particle sizes of about 50 to about 3000 microns.

17. A varicolored molded synthetic resin article of claim 15 wherein the molded article comprises at least about 2 percent by weight of the molded article of filled polyphthalamide resin chips.

18. A varicolored molded synthetic resin article of claim 15 wherein the molded article comprises about 2 to about 15 percent by weight of the molded article of filled polyphthalamide resin chips.

19. A varicolored molded synthetic resin article of claim 15 wherein the filled polyphthalamide resin chips are of various shapes.

* * * * *

UNITED STATES PATENT AND TRADEMARK OFFICE
CERTIFICATE OF CORRECTION

PATENT NO. : 5,457,152
DATED : October 10, 1995
INVENTOR(S) : Peter C. Gaa and Beth A. Rabroker It is certified that error appears in the above-identified patent and that said Letters Patent is hereby corrected as shown below:

Title page,
Item [75], after the word Gaa, please delete the word "Lott" and insert in its place the word -- Temple --;
Item [75], after the word Rabroker, please delete the word "Temple" and insert in its place the word -- Lott --.

Column 1,
Line 36, please delete the word "use" and insert in its place the word -- used --;

Column 3,
Line 28, please delete "25.000" and insert in its place -- 2500 --; and Column 8,
Line 11, please delete "! east" and insert in its place the word -- least --.

Signed and Sealed this

Thirtieth Day of October, 2001

Attest:

NICHOLAS P. GODICI
*Attesting Officer*   *Acting Director of the United States Patent and Trademark Office*